United States Patent
Kano et al.

(10) Patent No.: US 7,039,662 B2
(45) Date of Patent: May 2, 2006

(54) METHOD AND APPARATUS OF MEDIA MANAGEMENT ON DISK-SUBSYSTEM

(75) Inventors: Yoshiki Kano, Sunnyvale, CA (US); Manabu Kitamura, Cupertino, CA (US); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 10/786,566

(22) Filed: Feb. 24, 2004

(65) Prior Publication Data

US 2005/0198451 A1 Sep. 8, 2005

(51) Int. Cl.
*G06F 17/30* (2006.01)

(52) U.S. Cl. .................. 707/204; 707/200
(58) Field of Classification Search .............. None
See application file for complete search history.

(56) References Cited

U.S. PATENT DOCUMENTS

| | | | |
|---|---|---|---|
| 5,630,092 A | 5/1997 | Carreiro et al. | |
| 6,289,423 B1 | 9/2001 | Ozaki et al. | |
| 6,446,176 B1 | 9/2002 | West et al. | |
| 6,671,705 B1 | 12/2003 | Duprey et al. | |
| 6,714,952 B1 | 3/2004 | Dunham et al. | |
| 2002/0083084 A1 | 6/2002 | Suglyama | |
| 2003/0074378 A1 | 4/2003 | Midgley et al. | |
| 2003/0229764 A1* | 12/2003 | Ohno et al. ................. | 711/147 |
| 2003/0236956 A1 | 12/2003 | Grubbs et al. | |
| 2004/0172512 A1 | 9/2004 | Nakanishi et al. | |
| 2005/0097260 A1* | 5/2005 | McGovern et al. ......... | 711/100 |

* cited by examiner

*Primary Examiner*—Jean M. Corrielus
*Assistant Examiner*—Joon Hwan Hwang
(74) *Attorney, Agent, or Firm*—Townsend and Townsend and Crew LLP

(57) ABSTRACT

A method for migrating a block of data within a storage system includes migrating first data stored in a first storage volume of a first storage subsystem to a second storage volume in a second storage subsystem. The first data is a block of data that is presented to a host so that the first data may be accessed by the host. First setting information relating to the first data is copied from a first setting volume to a second setting volume. The first and second setting volumes are provided in the first and second storage subsystems, respectively. The second storage volume is presented to the host, so that the host may access the first data stored in the second storage volume via a communication network.

6 Claims, 13 Drawing Sheets

| Serial # | Command Device | |
|---|---|---|
| | WWN | LUN |
| 50121 | 10.00.00.00.C9.36.07.D7 | 0 |
| 50123 | 10.00.00.00.C9.36.07.AD | 254 |
| ... | ... | ... |

FIG. 5

| WWN | LUN | I-LU |
|---|---|---|
| 10.00.00.00.C9.36.07.D7 | 1 | 23 |
| 10.00.00.00.C9.36.07.D7 | 2 | 2 |
| ... | ... | ... |

FIG. 6

| Source Storage | | | Destination Storage | | |
|---|---|---|---|---|---|
| Storage ID | I-LU | Preservation Time | Storage ID | I-LU | Preservation Time |
| 20 | 2 | 500 | 30 | 2 | 0 |
| 20 | 3 | 500 | 30 | 3 | 0 |
| 20 | 5 | 300 | 30 | 5 | 400 |
| | | | 42 | 2 | 0 |
| ---- | ---- | ---- | ---- | ---- | ---- |

FIG. 12

| | Source Storage | | | Destination Storage | | |
|---|---|---|---|---|---|---|
| Storage ID | I-LU | Preservation Time | Storage ID | I-LU | Preservation Time |
| 20 | 2 | 200 | 30 | 2 | 0 |
| 20 | 3 | 200 | 30 | 3 | 0 |
| 30 | 5 | 400 | 42 | 2 | 0 |
| ---- | ---- | ---- | ---- | ---- | ---- |

FIG. 13

METHOD AND APPARATUS OF MEDIA MANAGEMENT ON DISK-SUBSYSTEM

BACKGROUND OF THE INVENTION

The present invention relates to management of disk storage system.

Data is the underlying resources on which all computing processes are based. With the recent explosive growth of the Internet and e-business, the demand on data storage systems has increased tremendously. There are many types of storage devices, e.g., semiconductor devices, magnetic disk, and magnetic tapes, that may be used to store data. Each of these types of storage devices have different access speeds and costs associated thereto. The semiconductor devices are generally the fastest and also the most expensive. Accordingly, they are not commonly used in data centers where massive amounts of data need to be stored.

Generally, magnetic disks and tapes are the storage devices of choice for the data centers since they tend to be considerably cheaper than the semiconductor devices. The storage system for a data center generally has multiple processors and includes sophisticated operating systems for quickly reading and writing massive amounts of data.

Data centers or storage systems commonly includes a plurality of storage units or subsystems. Some are configured to be primary storage devices, and others are configured to be secondary storage devices. The primary storage devices are designed to store active data that users may access, whereas the secondary storage devices serves as back-up devices to be used in case the primary storage devices experience failure. The secondary devices are also used to store or archive "inactive" or "stale" data that the primary device does not need, so that the storage capacity of the primary devices may be freed-up for new data. As used herein, the term "archiving" refers to copying data from a first storage device to a second storage device and then deleting the data stored in the first storage device, so that the storage capacity of the first storage device is freed-up for new data.

The primary storage device is located at a primary site, and the secondary storage device is located at a secondary site that may be dozens, hundreds, or even thousands of miles apart from the primary site.

The magnetic disk storage devices are commonly used in the primary storage devices for "active" data because access to specific data in a magnetic disk storage device is more rapid than access to data in a magnetic tape device. On the other hand, the magnetic tape devices are used in the secondary storage devices or vaults to archive or back-up data due to its relatively low cost.

However, the use of the magnetic tape devices in the secondary site poses some problems. The "inactive" data need to be copied onto a tape and then the tape physically shipped or delivered to the secondary site. In addition, the archived data cannot be made to the user quickly since they need to be physically transferred back to the primary site and then loaded on the primary device before the users can access them. Moreover, the archived tapes need to be managed by the secondary device and generally cannot be managed remotely using the primary device.

Due to recent technological innovations, the cost of disk devices have come down dramatically. The disk bit cost for certain disk devices, e.g., ATA-disk, is becoming comparable to that of the tape or optical media bit cost. Accordingly, many venders are considering the use of the current disk subsystem as an archived storage system.

However, there are certain problems associated with using the disk subsystem as an archived storage system. The maximum number of Logical Unit (LU) per a Fibre Channel port is 512. This may not be enough for certain uses associated with the backup and archive system. In which case, the storage system needs to prepare additional ports to define more LUs. In addition, when performing internal LU in a storage system, the attributes, e.g., retention information, media ID, and the like, for each volume also need to be forwarded on an understandable way from an archive host to an archive target, which the current disk systems are not configured to perform.

BRIEF SUMMARY OF THE INVENTION

The present invention relates to using a disk storage subsystem as a back-up or archive system. The data may be migrated to the back-up or archive storage system at a block level or in SCSI environment.

Embodiments of the present invention disclose the use of a unique identifier for Internal LU (a.k.a I-LUor logical device) which is created from a storage subsystem in the storage subsystems. The unique identifier is defined by the storage subsystem serial number and logical device number of a given storage volume or Logical Unit (LU). Unused LUs on a port are disconnected or detached, so that they would not needlessly use the Logical Unit Numbers (LUNs) since a port cannot have more a given number of LUNs, e.g., 512 LUNs, under the Fibre Channel protocol.

The attributes for each internal LU or I-LU are forwarded or migrated in a transparent method (or in a manner that is understandable by the application running in the host) since the host may continue to use the archive environment. The attributes are stored in a different location from the location where the corresponding data are stored according to one embodiment. An emulation module is provide to enable a transparent data migration, so that the data may be migrated to a new environment without changing the software in host. In one embodiment, the serial number is emulated. Alternatively, the volume emulation types and control API for each storage system may be emulated.

In one embodiment, a method for migrating a block of data within a storage system includes migrating first data stored in a first storage volume of a first storage subsystem to a second storage volume in a second storage subsystem. The first data is a block of data that is presented to a host so that the first data may be accessed by the host. First setting information relating to the first data is copied from a first setting volume to a second setting volume. The first and second setting volumes are provided in the first and second storage subsystems, respectively. The second storage volume is presented to the host, so that the host may access the first data stored in the second storage volume via a communication network.

In one embodiment, a storage system includes first and second storage subsystems. The first storage subsystem is coupled to a host. The host is configured to access first data stored in a first storage volume that is provided in the first subsystem. The first data are associated with first setting information stored in a first setting volume of the first subsystem. The first storage volume is associated with a first storage volume number to enable the host to access the first storage volume via a first communication link. The first data is a block of data. The second storage subsystem is coupled to the first storage subsystem and the host. The second subsystem includes a second storage volume to receive the first data from the first storage subsystem via a second communication link and a second setting volume to receive the first setting information from the first setting volume. The second subsystem further includes a storage emulator to associate the first storage volume number to the second storage volume to enable the host to access the first data stored in the second storage volume. The first data are migrated from the first storage volume to the second storage volume after a retention period defined for the first data has been expired.

In another embodiment, a storage system configured to provide data migration of a block of data includes means for migrating first data stored in a first storage volume of a first storage subsystem to a second storage volume in a second storage subsystem, the first data being a block of data that is presented to a host so that the first data may be accessed by the host; means for copying first setting information relating to the first data from a first setting volume to a second setting volume, the first and second setting volumes provided in the first and second storage subsystems, respectively; and means for presenting the second storage volume to the host, so that the host may access the first data stored in the second storage volume.

In yet another embodiment, a computer readable medium includes a computer program for migrating a block of data. The computer program comprises code for migrating first data stored in a first storage volume of a first storage subsystem to a second storage volume in a second storage subsystem, the first data being a block of data that is presented to a host so that the first data may be accessed by the host; code for copying first setting information relating to the first data from a first setting volume to a second setting volume, the first and second setting volumes provided in the first and second storage subsystems, respectively; and code for presenting the second storage volume to the host, so that the host may access the first data stored in the second storage volume.

As used herein, the term "storage system" refers to a computer system configured to store data and includes one or more storage units or storage subsystems, e.g., disk array units. Accordingly, the storage system may refer to a computer system including one or more hosts and one or more storage subsystems, or only a storage subsystem or unit, or a plurality of storage subsystems or units coupled to a plurality of hosts via a communication link.

As used herein, the term "storage subsystem" refers to a computer system that is configured to store data and includes a storage area and a storage controller for handing requests from one or more hosts. The storage subsystem may be referred to as a storage device, storage unit, storage apparatus, or the like. An example of the storage subsystem is a disk array unit or disk storage subsystem.

As used herein, the term "host" refers to a computer system that is coupled to one or more storage systems or storage subsystems and is configured to send requests to the storage systems or storage subsystems. The host may perform the functions of a server or client.

BRIEF DESCRIPTION OF THE DRAWINGS

FIG. 5 illustrates a table mapping the location and serial number for a storage subsystem according to one embodiment of the present invention.

FIG. 6 illustrates a LUN table which includes WWN, LUN, and I-LU numbers according to one embodiment of the present invention.

FIG. 12 shows an example of migration management table according to one embodiment of the present invention.

FIG. 13 illustrates the changes to the migration management table after a given period has elapsed according to one embodiment of the present invention.

DETAILED DESCRIPTION OF THE INVENTION

Figure 1:
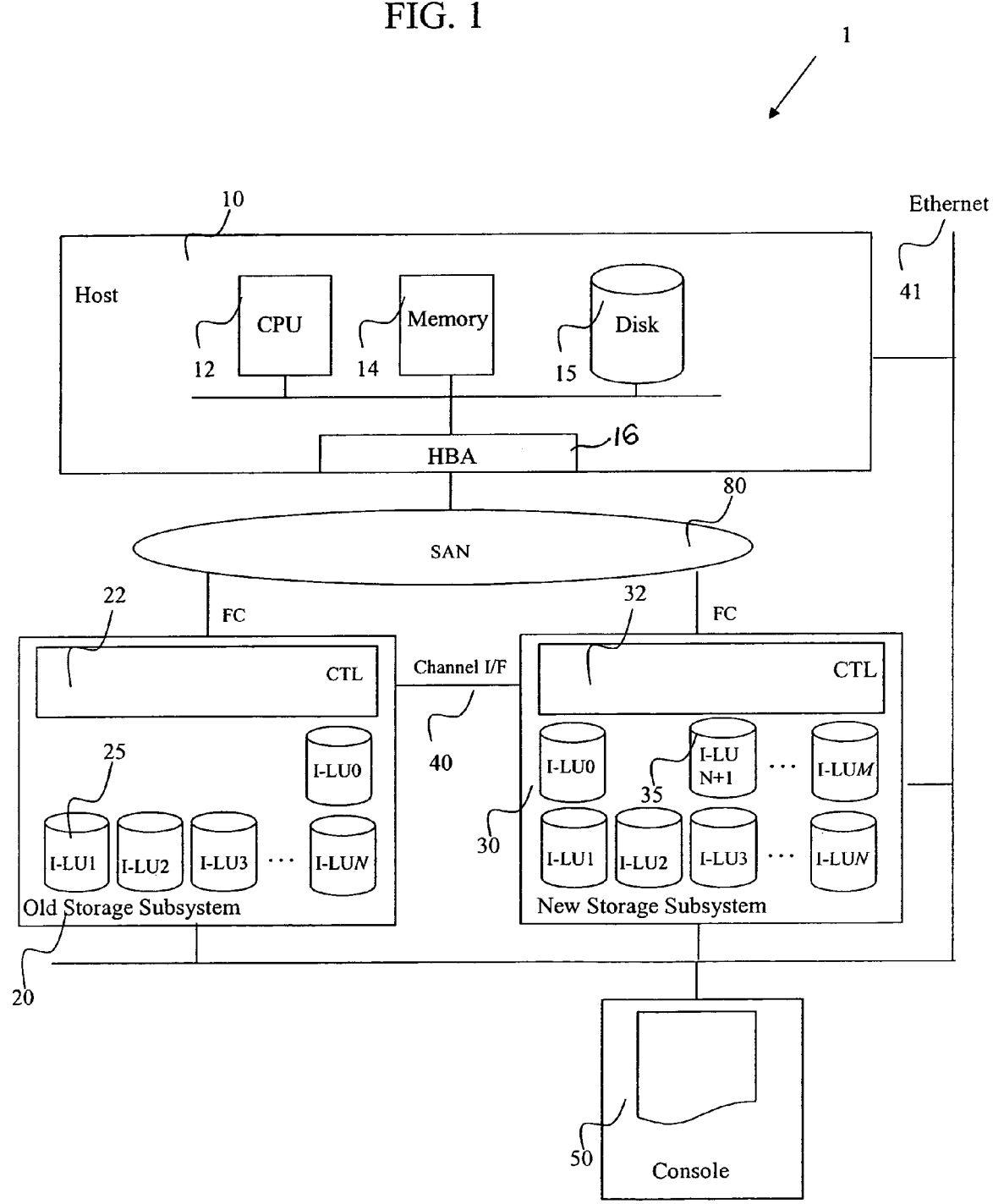
FIG. 1 illustrates a storage system 1 according to one embodiment of the invention.

FIG. 1 illustrates a storage system 1 according to one embodiment of the invention. The storage system includes a host 10, a management console 50, and first and second storage subsystems 20 and 30. The first storage subsystem and second storage subsystem are also referred to as the old storage subsystem and new storage subsystem, respectively. The host 10 typically is a commercially available conventional computer system, for example, a server, that is configured to access the storage subsystems. In the depicted embodiment, the host 10 includes a central processing unit (CPU) 12, a memory 14, an external I/O interface or Host Bus Adapter (HBA) 16, and a storage disk 15. The storage disk 15 typically provides storage for an operating system, application software, and storage subsystem management software.

Each of the old and second storage subsystems 20 and 30 includes a control processor 22 or 32 and a series of storage volumes 25 or 35 for storing data. The storage volumes or internal Logical Units (LUs) are defined on hard disk drives or arrays of hard disk drives (e.g., configured as a RAID system) according to the present embodiment. Like the host 10, the control processor 22 or 32 includes a central processing unit, and preferably includes non-volatile random access memory (NVRAM), so that certain data stored therein would be protected from a power failure. The control processor is also referred to as a storage or disk controller. The disk controller manages the access to the I-LUs in the storage subsystem.

The disk controller provides a plurality of ports, each being provided with a World Wide Name (WWN) that is used as the target ID in an SCSI environment. Each port may be associated with a certain maximum number of LUs. Currently, this maximum number is 512 LUs. Each LU is provided with a Logical Unit Number (LUN) as identification information. A SCSI port corresponds to a physical port in Fibre Channel. The controller may define a plurality of virtual ports from a single physical port in order to provide a greater flexibility in managing the data.

The internal LUs 25 or 35 are configured to store data or setting information. The I-LUs that store data are referred to as data volumes, and the I-LUs that store setting information are referred to setting volumes. Data as used herein generally refers to the core content or information that a user wishes to access. The setting information is administrative information that is used to manage the data stored in the data volumes. The term "storage volume" is a generic term that may refer to the data volume or setting volume, or both. The storage volumes may be configured in a variety of known configurations, for example, RAID 0, RAID 5 or other technologies.

The console 50 is configured to manage storage subsystems. For example, the console is used to define, attach and detach internal LUs or LUNs for the storage subsystems. Although the console is shown as an external server in FIG. 1, it may be integrated to a storage subsystem.

The host and storage subsystems are coupled together using an Ethernet based network 41 as out-of-band control in one embodiment of the present invention. An example of such a network is a Storage Area Network (SAN). For the control of the storage subsystem, the block input/output operations are provided over an in-band connection. For the copy operation between the first and second storage subsystems, a channel interface 40 is used. In one embodiment, the interface 40 utilizes the Fibre Channel protocol. Other types of communication interfaces and protocols may be used for the host-to-subsystem communications and the subsystem-to-subsystem communications, e.g., SCSI, iSCSI, token ring, and the like. In one embodiment, the channel interface 40 and the network 80 may be a single communication network.

Figure 2:
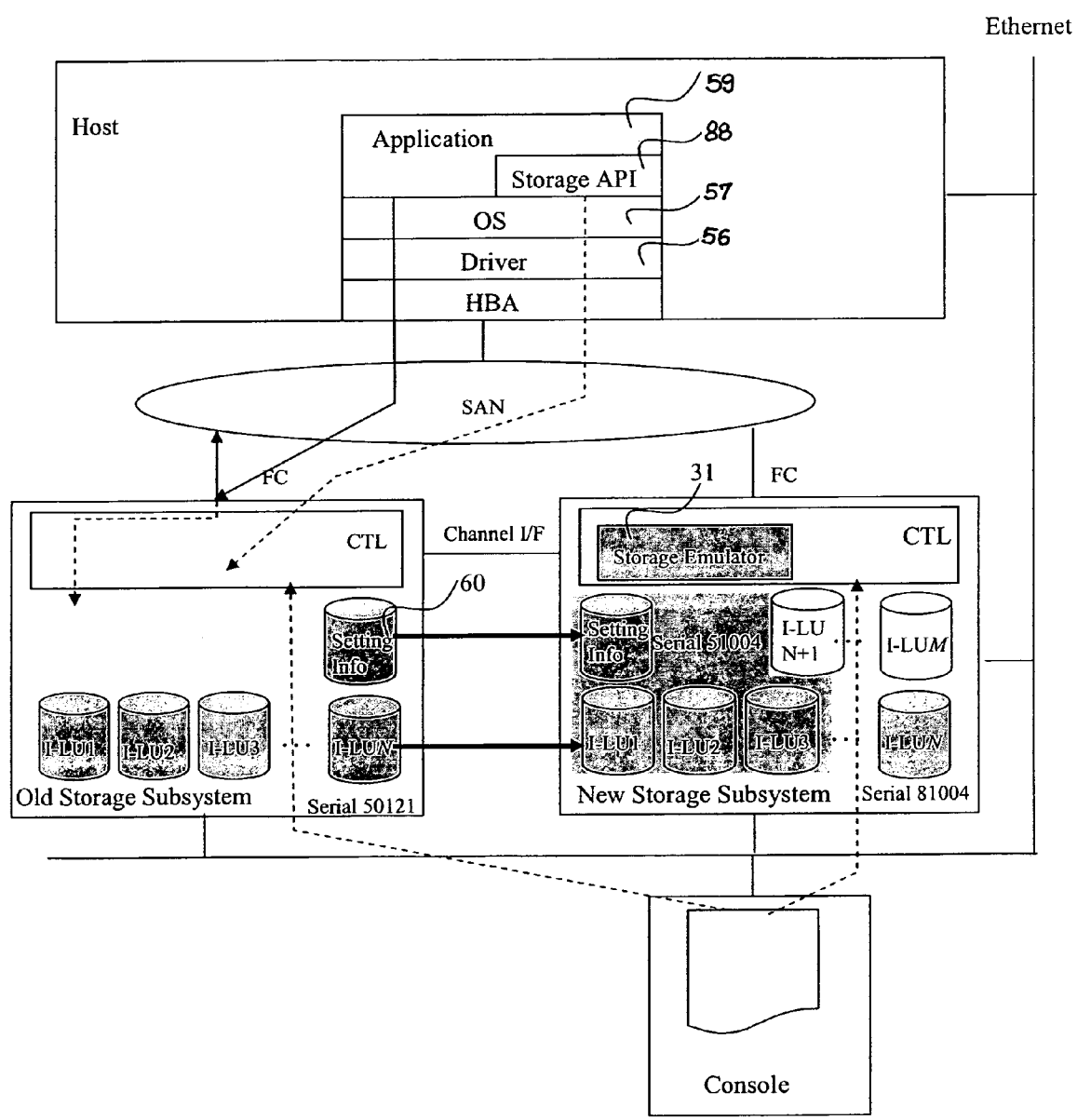
FIG. 2 illustrates software components associated with a storage system according to one embodiment of the present invention.

FIG. 2 illustrates software components associated with the storage system 1 according to one embodiment of the present invention. Solid lines indicate the flow of data, and dashed lines indicate the flow of control information. The host 10 includes a driver 56, an operating system 57, and an application 59. The application 59 includes a storage application program interface (API) 88 to interface with the storage subsystems. The driver controls the HBA to access block devices, e.g., the disk devices in the storage subsystems. The OS provides an environment wherein the application 59 may be run. The application is operable to read and write data to and from storage subsystems.

The controller 32 of the second storage subsystem 30 manages the storage subsystem. The controller maps LUs to LUNs, i.e., controls the detaching or attaching of internal LUs to specified LUNs assigned to a given port number. A storage emulator 31 included in the controller provides a capability to emulate internal LU numbers and serial numbers which are defined in the first storage subsystem.

The emulator 31 provided on the second subsystem may also provide other functionalities, e.g., I/O simulate, volume emulation mode, and management interface to control the first subsystem. An example of the volume emulation mode is OPEN-3, K, L, and V that are provide by Hitachi 9900V series.

The controller also provides a copy feature for the data stored in an internal LU of the first storage subsystem to the second storage subsystem via the channel 40. An example of such a copy feature is Hitachi True Copy™ or Hitachi HiCopy™ In Hitachi True Copy™ and Hitachi HiCopy™, the console defines two volumes as a pair, so that data may be copied from one volume to another. Once these volumes are synchronized, i.e., are provided with a mirror data image, then these volumes are split to be used in other operations.

The controller controls the access to the LUs of the second storage subsystem. For example, the controller may suspend writing to a given LU if the storage API 18 sends a lock command to the controller regarding a given LU managed by the controller. The write suspend as explained below or lock command is terminated if the controller receives an unlock command from the storage API. In one embodiment, the storage API causes the write data to be stored temporarily while the LU is in a locked state, so that these temporarily stored data may be written to the LU once it has been unlocked.

The controller 22 of the first storage subsystem 20 provides at least a copy feature to the first storage subsystem. The controller 22 may provide other features as well.

The setting information stored in a setting volume 60 of the first subsystem provides the setting (or administrative information) for internal LUs. In certain implementations, the setting information includes the port information. The LU is also referred to as a Logical Device or LDEV. In the present embodiment, a volume locking feature is used, which is referred to as Hitachi LDEV Guard™. The LDEV Guard™ assigns attributes to the LDEVs or LUs and executes the attributes. The controller on the storage subsystem executes the functions according to the attributes.

Examples of such attributes include Read IO Enable/Disable, Write IO Enable/Disable, INQUIRY IO Enable/Disable, Return size 0 capacities/correct capacity, and SVOL enable/disable. The attribute for Read IO Enable is executed to process a READ(6) command in SCSI. The attribute for Read IO Disable is executed to prevent processing of a READ(6) command in SCSI. The attribute for Write IO Enable is executed to process a WRITE(6) command in SCSI. The attribute for Write IO Disable is executed to not to prevent processing of a WRITE(6) command in SCSI. The attribute for inquiry IO Enable is executed to process an INQUIRY command in SCSI. The attribute for inquiry IO Disable is executed to prevent processing of an INQUIRY command in SCSI. The attribute for read capacity 0/correct size is executed to return the 0 size or correct size for read capacity in SCSI command. The attribute for SVOL Enable/Disable is executed to cause a volume to be a Secondary Volume for copy feature like Shadow Image or True Copy or prevent the volume from becoming such a Secondary Volume.

In order to prevent accidental or unauthorized changes to the attributes, the attributes may be marked to permit or prevent changes to them. This permission feature is linked with the retention time feature, as explained below.

Figure 3:
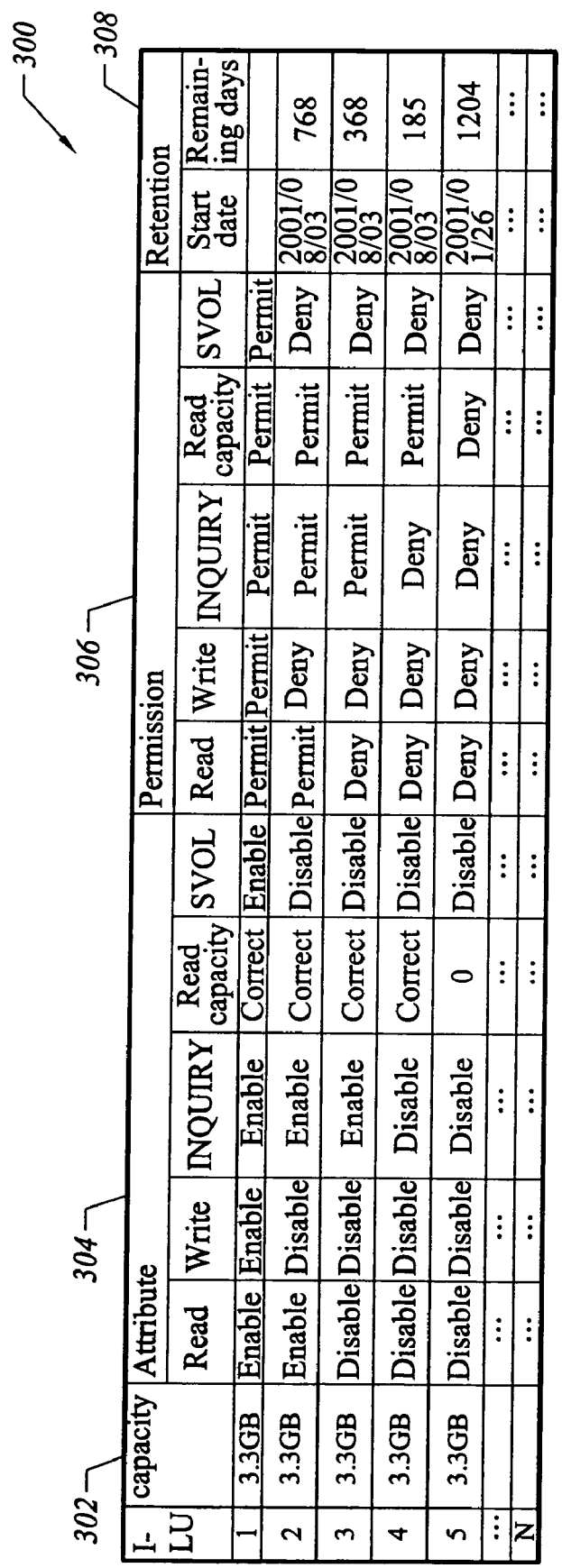
FIG. 3 illustrates an exemplary setting information table for internal LUs.

The retention time feature has a start date field and a remaining date field (see FIG. 3). If an administrator sets the retention time for a given block of data, the disk controller locks the permission feature for that block of data, so that the attributes associated with the given block of data cannot be changed during the specified retention period. The permission feature is unlocked once the retention period expires, i.e., the remaining date is zero. At that time, a user or administrator is free to change the attributes.

FIG. 3 illustrates an exemplary setting information table 300 for internal LUs. The dash "-" indicates no definition has been made for the corresponding field. Each row or record is assigned to a given LU or block of data. A column 302 indicates the storage capacity of the LUs. An attribute section 304 indicates various attributes assigned to the LUs.

For example, for each LU, it is defined whether or not READ is enabled or disabled, WRITE is enabled or disabled, INQUIRY is enabled or disabled, READ CAPACITY is 0 or correct, and SVOL feature is enabled or disabled. A permission section 306 indicates various permission information relating to the attributes of the LUs. For example, for each LU, it is defined whether or not READ is permitted or denied, WRITE is permitted or denied, INQUIRY is permitted or denied, READ CAPACITY is permitted or denied, and SVOL feature is permitted or denied. A retention section 308 indicates the start date and remaining days for the LUs. The start date indicates the date that the permission information was defined. The remaining days indicates the number of days the permission information provided in the permission section 306 is to stay in effect.

These attribute and permission information are set by the storage API in the present embodiment. The remaining days are also set by the storage API in the present embodiment. The start date is defined by the disk controller. In the present embodiment, the remaining days information cannot be decreased in value once set. Its value, however, may be increased. For example, once 1000 days is set as the remaining days value for a given LU. A user or administrator cannot reduce this value, e.g., to 900 days, but may increase this value, e.g., to 1500 days.

In the present embodiment, the setting information table also includes the port, internal LUs, and LUNs mapping information (see FIG. 6). However, these setting information is not shown in FIG. 3. Generally, each internal LU (I-LU) has the port mapping information if I-LU is exported to SAN. The table 300 relating to attributes, permission, and retention is stored on the setting information volume 60 in the first storage subsystem. This setting information is migrated to the second storage subsystem to be activated when the data stored in the data volumes in the first subsystem are migrated to the second subsystem, as will be explained later. The mapping information of FIG. 6 are also stored in the setting volume 60 and transferred to the setting volume of the second subsystem during the migration.

In the present embodiment, an I-LU is mapped to an LUN using attach and detach functions or commands. That is, these commands, issued by the storage API, attaches and detaches an I-LU to a given LU assigned to a port. Examples of the attach and detach commands are provided below.

int attach_device(int storage_serial_num, int internal_device_num, int to_LUN, int port_number, int virtual_port_number)

int detach_device(int storage_serial_num, int to_LUN, int port_number, int internal_device_num)

The attach_device" function or command is used to attach an I-LU to the LUN specified by "to_LUN" on a specified "port_number" or "virtual port number." To specify a unique volume within the storage subsystem, the "attach_device" function uses "internal_device_num" as a unique number for I-LU, and also may use "storage_serial_num" as a unique serial number among storage subsystems and within the storage system 1. The storage API discovers the target storage subsystem using an inquiry command.

Figure 4:
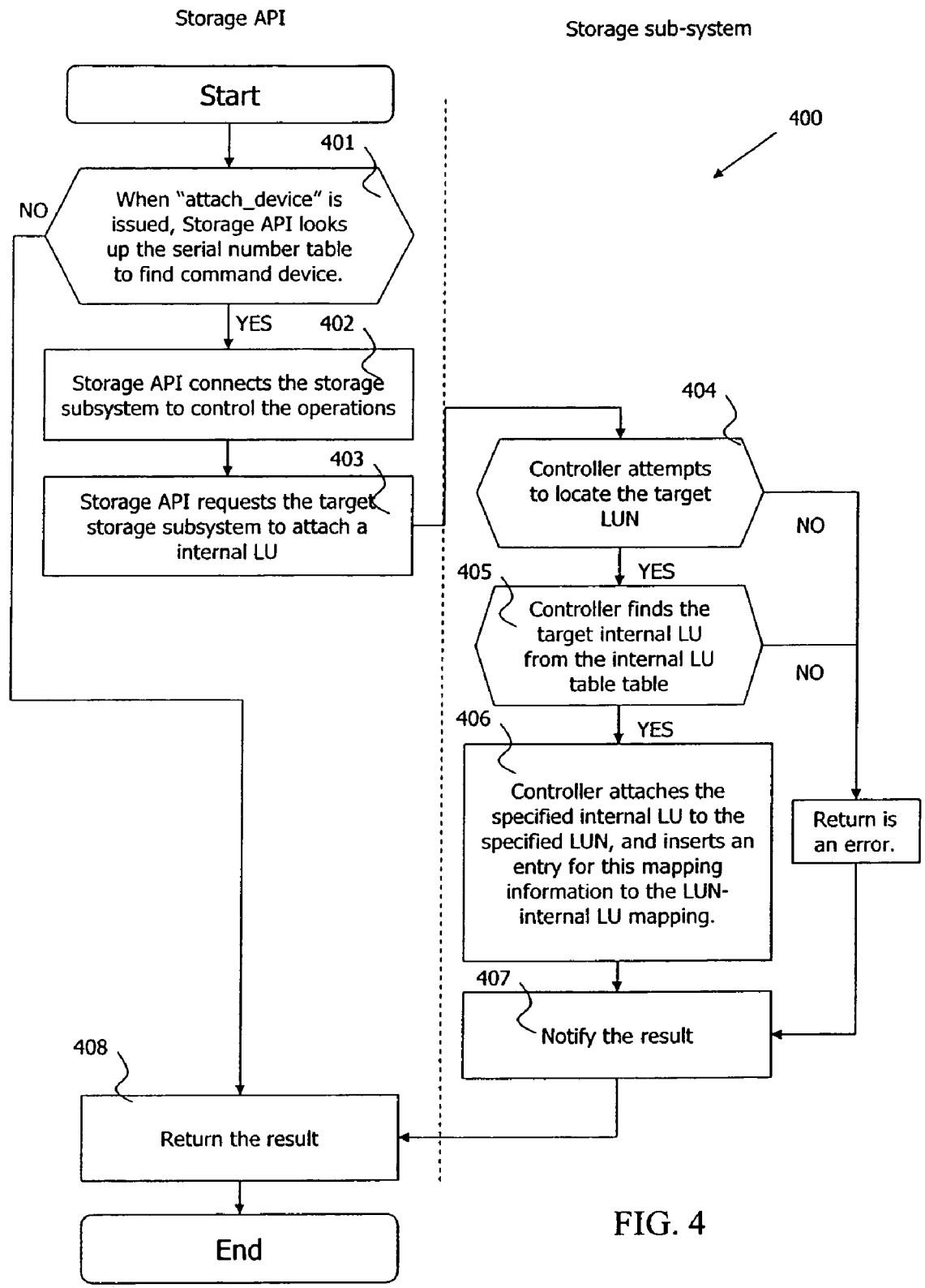
FIG. 4 illustrates a process for discovering the target storage subsystem according to one embodiment of the present invention.

FIG. 4 illustrates a process 400 for discovering the target storage subsystem according to one embodiment of the present invention. At step 401, when the "attach_device" command is issued, the storage API looks up a serial number table (FIG. 5) to find command device. If there is not an entry for the serial number, the storage API returns an error message. The storage API maintains the serial number table of mapping between the location and serial number for the storage subsystem. The location is specified by the command device's LUN and WWN if in-band communication is used or IP address if out-band communication is used. The serial number table may be generated automatically or by an operator.

The storage API connects to the storage subsystem to control the attach operation using an in-band communication or out-band communication (step 402). The storage API requests the target storage subsystem to attach an I-LU specified by "internal_device_num" parameter to a path specified by "to_path" parameter (step 403).

The disk controller of the target storage subsystem locates the target LUN from an attached LUN table (FIG. 6) which includes WWN, LUN, and I-LU numbers (step 404). If the specified LUN has already been used, the controller returns an error message to the storage API and jumps to step 407. Otherwise, the process proceeds to step 405.

At step 405, the controller locates the target internal LU from their internal LU table (FIG. 3). The table provides the I-LU numbers and remaining time if the volume has been provided with retention time for volume locking feature or customer's stored retention for volume. If the specified LU has already been used, the controller returns an error message to the storage API and jumps to step 407. Otherwise, the process proceeds to step 406.

At step 406, the controller attaches the specified internal LU to the specified LUN, and inserts an entry for this mapping information to the LUN-internal LU mapping.

At step 407, the controller notifies to the storage API of the results of the operation, i.e., whether or not it was a success. The storage API notifies the results to the application 19 (step 408).

Once the "attach_device" operation has been successfully executed, the device driver of the host can access the attached I-LU, so that the application 19 may perform read and write operations to the volume as a raw volume using SCSI-3 server block command if the device driver has already discovered the volume and created the device file. Exemplarily device files in Unix® environment is '/dev/rdsk/c2t0d1' and Windows™ Win32API environment is '\\.\PHYSICALDRIVE 1'.

Figure 7:
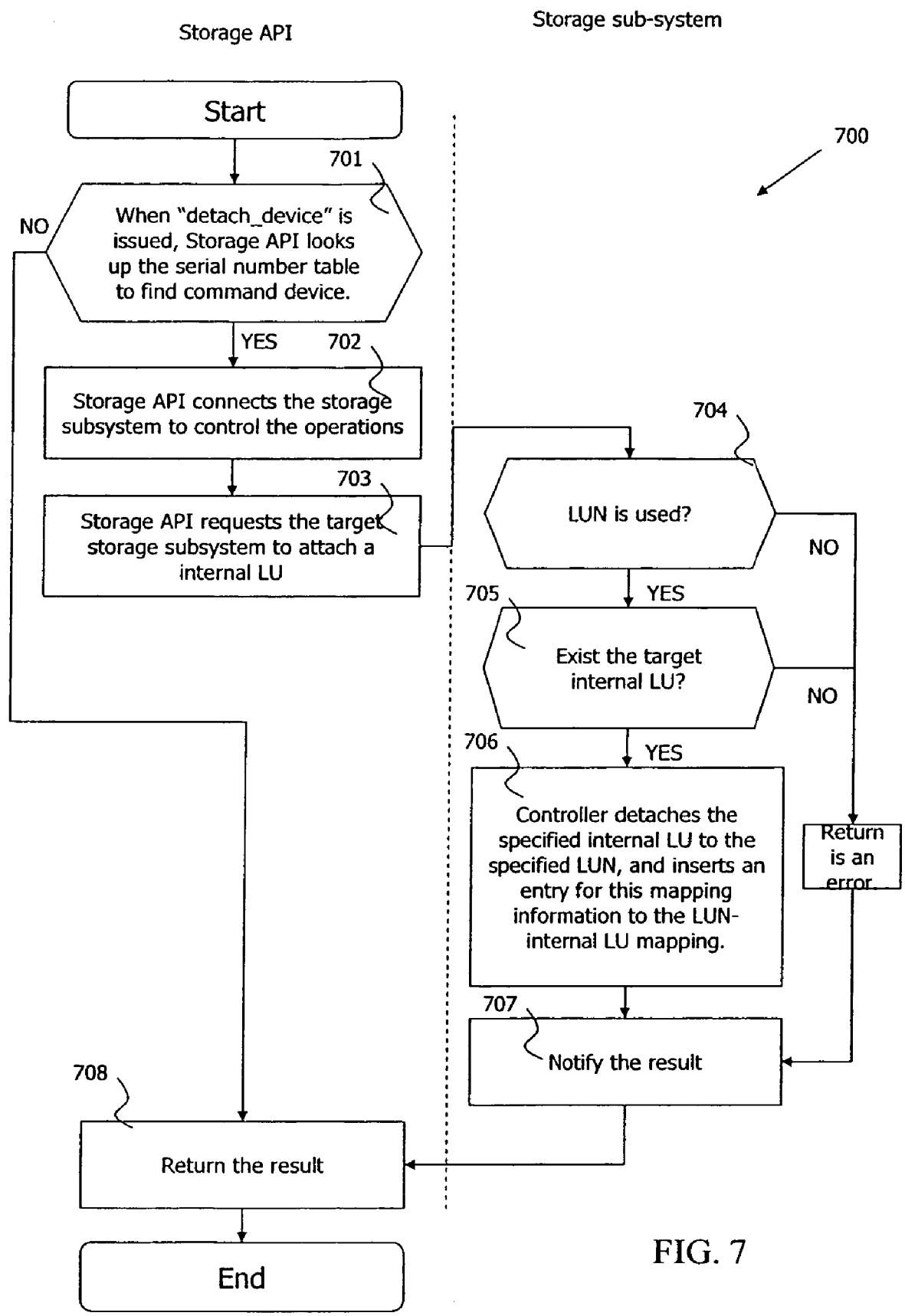
FIG. 7 illustrates a process for detaching an I-LU from an LUN according to one embodiment of the present invention.

FIG. 7 illustrates a process 700 for detaching an I-LU from an LUN according to one embodiment of the present invention. The "detach_device" function operates to detach the specified internal LU from the specified LUN on the specified port. At step 701, when s a "detach_device" command is issued, the storage API looks up the serial number table (FIG. 5) to find the command device. If there is not an entry for the serial number, the storage API returns an error message. The process then jumps to step 708.

At step 702, the storage API links to the storage subsystem to control the detach operation using either an in-band or out-band communication network. The storage API requests the target storage subsystem to detach an I-LU specified by "internal_device_num" parameter from a path specified by "to_path" parameter (step 703).

At step 704, the disk controller of the storage subsystem locates the target LUN from the attached LUN table (FIG. 6). If the specified LUN is not mapped to any I-LU, the controller returns an error message to the storage API, and the process jumps to step 707. Otherwise, the process proceeds to step 705.

At step 705, the controller locates the target I-LU from the I-LU table (FIG. 3). If the specified LU is not listed therein, the controller returns an error message to the storage API, and the process jumps to step 707. Otherwise, the process proceeds to step 706, where the controller detaches the specified I-LU from the specified LUN, and deletes the corresponding mapping information.

At step 707, the controller notifies the storage API as to the results of the operation, i.e., whether the detach operation was successfully implemented or not via the control path. The storage API notifies the result (step 708).

Based on these attach and detach operations, the host can read and write thousands of volumes using a few attached LUNs and a few paths instead of attaching thousands of volumes on several paths. The emulator module provides a serial number. The module provides a capability to access data specified by the internal LU number when the LU number is specified on the storage API.

In one embodiment, the data and the setting information from the first storage subsystem 20 are migrated to the second storage subsystem 30 transparently from host perspective, so that the host can access the migrated data stored in the second subsystem 30. The setting information includes the internal LU information (see FIG. 3) as one of setting information. When using a volume lock feature for I-LU that provides write protect for the attached internal LU during the retention period specified by the user, the retention term information for each I-LU is migrated during a volume migration from one storage subsystem to another. That is, each I-LU has a retention term for the attributes, and whenever the I-LU is being migrated, the controller of the second storage subsystem migrates the retention term as part of the setting information.

Figure 8:
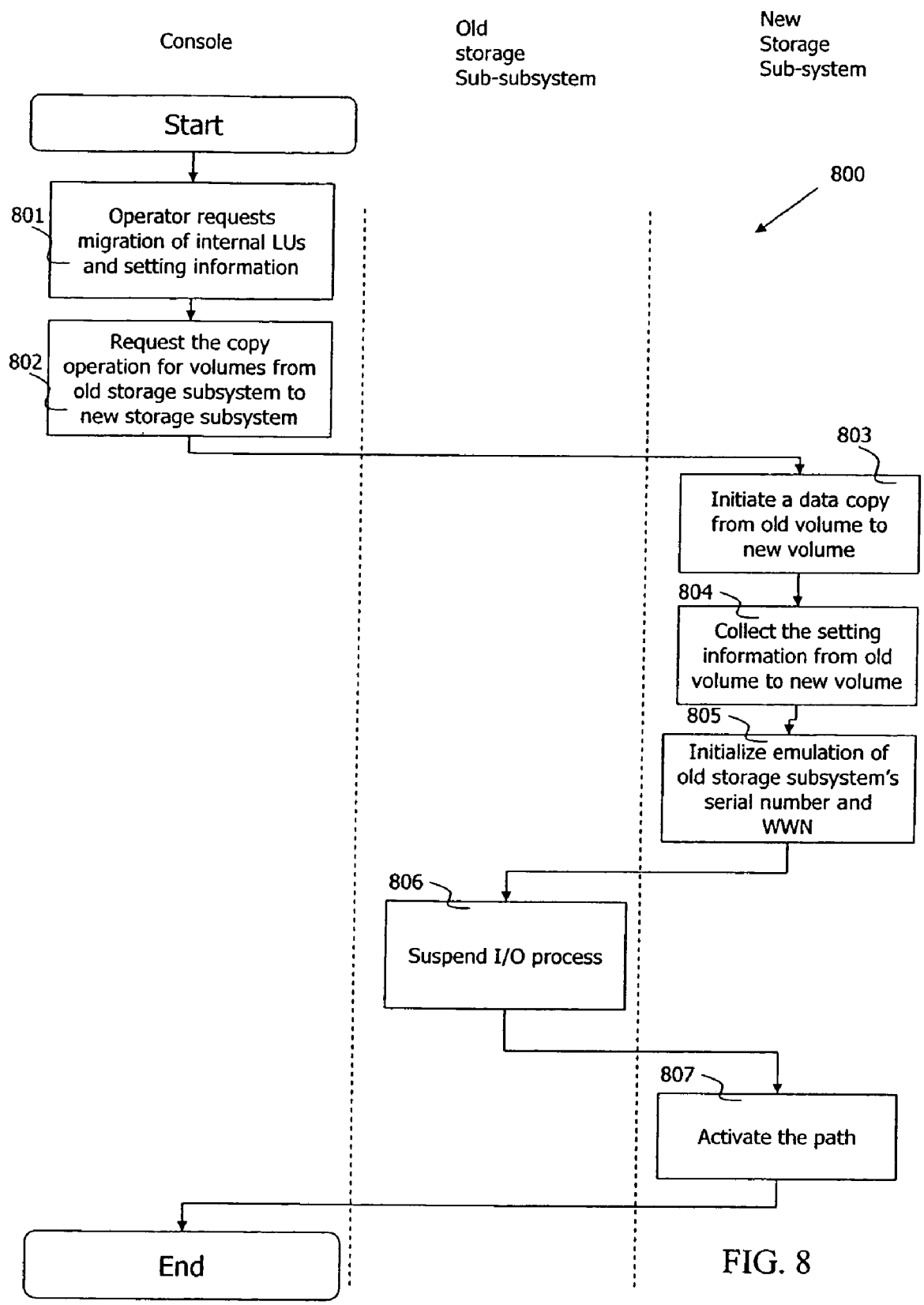
FIG. 8 illustrates a process for migrating the data and setting information from the first storage subsystem to the second storage subsystem according to one embodiment of the present invention.

For illustrative purposes, the data migration of the present embodiment is explained using the physical system of FIG. 1 and the software and modules of FIG. 2. FIG. 8 illustrates a process 800 for migrating the data and setting information from the first storage subsystem to the second storage subsystem according to one embodiment of the present invention.

At step 801, an administer or user issues a command to migrate the data and setting information using the console 50. A request or command for copy operation from an I-LU of the first storage subsystem 20 to the second storage subsystem 30 is made from the console (step 802).

At step 803, the disk controller 32 on the second storage subsystem initiates the requested copy operation, so that the data stored in an I-LU (first I-LU) of the first storage subsystem may be migrated to an I-LU (second I-LU) in the second storage subsystem. The disk controller 32 collects the setting information 60 from the first storage subsystem (step 804). The setting information includes the attached LUN information (FIG. 6) and the internal LUs information (FIG. 3).

At step 805, after the copy operations, the second storage subsystem initializes the setting information that was previously used in the first storage subsystem. That is, the emulation procedure is initiated by the emulator to present the second I-LU to the host. The second storage subsystem uses the detach capabilities to request the first storage subsystem to inactivate the old port that is used for the attached volume to temporarily the suspend I/O process to the attached volume (step 806). The new storage system invokes a new port as an active path to continue processing the I/O requests (step 807).

To operate on the new subsystem, the emulation module provides a serial number to the host. This serial number is obtained by scanning the equipment. The serial number is needed for each control path to manage the new or second storage subsystem. The control path may be defined on an in-band or out-band communication network.

For in-band management, disk controller 32 presents the serial number as a field for an SCSI inquiry field instead of as that of the second storage subsystem. For out-band management, the controller module creates another instance to accept management of the emulated storage subsystems in step 807. This instance has another IP address that is different from the IP address of the second storage subsystem 30 and controls the emulated storage subsystem. The emulation module provides the serial number to the host via this instance when the request is received from the host.

When the application uses the attach or detach operation, the setup phase of these operations discovers the storage subsystems, including the emulated storage subsystem. The host may use the attached/detach operation after the storage subsystem has been discovered. After the volume has been attached, the host may access the attached internal LUs using ordinary read, write, and other SCSI server block commands. Accordingly, the host transparently migrates the data from old subsystem to new subsystem while the host I/O operations are being processed in the host.

As another feature, the storage system 1 is configured so that the management console may provide the setting information for the volume on migration and convert the current table. The setting information includes the internal LUs information (FIG. 3) as part of the setting information.

Figure 9:
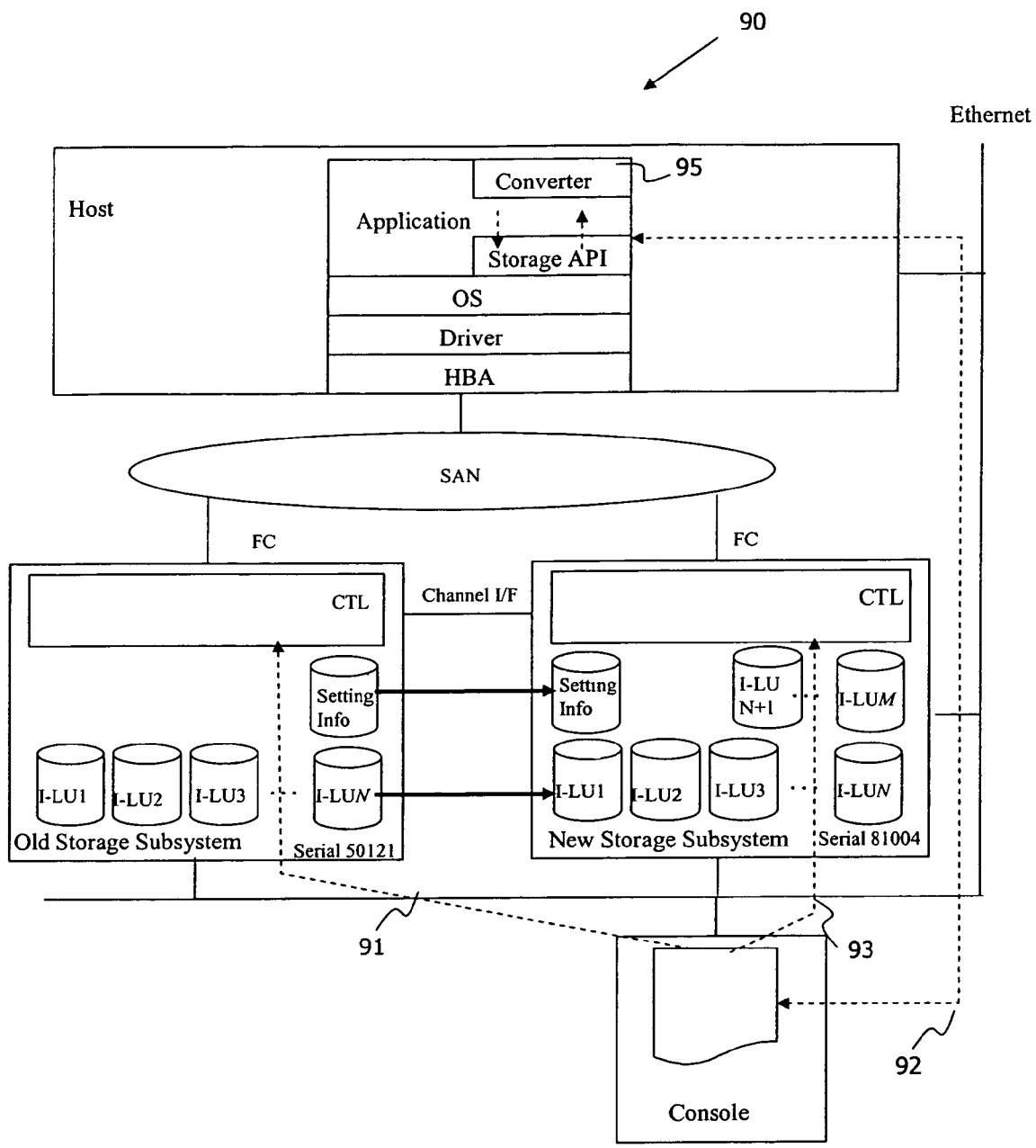
FIG. 9 illustrates a method of migrating the copy data using the hardware features of a storage subsystem according to one embodiment of the present invention.

FIG. 9 illustrates a method of migrating the copy data using the hardware features of a storage subsystem 90 according to one embodiment of the present invention. A mapping table for the location of a volume between the old and new storage subsystems is provided. The modules and structure of the subsystem 90 are substantially the same as the subsystem 1 of FIG. 2. One difference is the serial number emulation. Another difference is the directions of control path. The serial number emulation 31 associated with the subsystem 30 of FIG. 2 is not need in the present embodiment.

The control paths are represented by the dash lines 91, 92, and 93. The dash line 92 represents the flow of control information used to control the data migration and to collect the mapping information between the application and system console. The dash line 91 is between the console and the first storage subsystem to collect the location of the internal volume. The dash line 93 is between the console and the second storage subsystem to collect the location of the internal LU of the new storage system.

Figure 10:
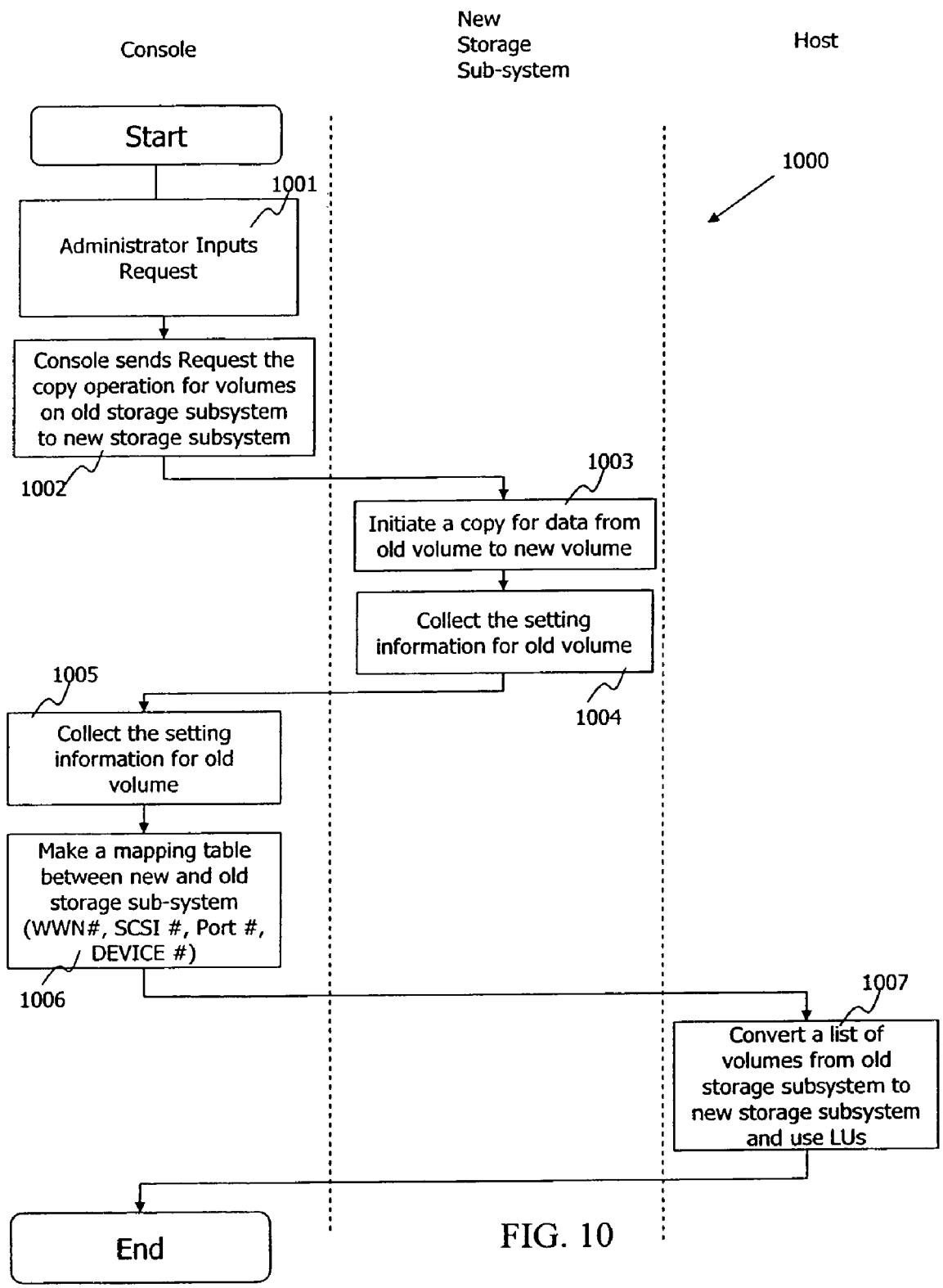
FIG. 10 illustrates a process for migrating data from the first subsystem to the second subsystem according to one embodiment of the present invention.

FIG. 10 illustrates a process 1000 for migrating data from the first subsystem to the second subsystem according to one embodiment of the present invention. At step 1001, an administrator initiates the migration of the data and setting information associated with the first subsystem to the second subsystem using the console. The application places the LUs offline.

At step 1002, the console transmits a copy operation request to migrate data stored in the target internal LUs in the first storage subsystem 20 to the I-LUs in the second storage subsystem 30. The disk controller 32 on the second storage subsystem initiates the requested copy operation to migrate the data from the volume in the first subsystem (i.e., the first volume) to a volume (i.e., the second volume) in the second storage subsystem (step 1003). After the copy operation, the controller activates the copied internal LU, LUN, and port, whereupon, the host can access the second volume.

At step 1004, the disk controller 50 collects the setting information regarding the copied volume. The setting information includes attributes, e.g., the retention period for the internal LU from the first storage subsystem.

The console collects the setting information from first storage subsystem (step 1005). The console generates a mapping table for the internal LUs of the first and second storage subsystems (step 1006). This table includes a first column for the I-LUs in the first storage subsystem and a second column for the I-LUs in the second storage subsystem. The I-LU of the first storage subsystem is matched to the I-LUs of the second subsystem to where the data have been copied.

At step 1007, the host collects the mapping table for internal LU and converts their application's table entries for the internal LUs, LUNs, ports, retention time, and the like on the first storage subsystem to those on the second storage subsystem and use LU as an active LU to continue processing the I/O operation. As disclosed, the process 1000 enables the storage system to migrate the data while retaining the attributes of the corresponding internal LU.

If data are copied within the same storage subsystem, e.g., using ShadowImage™ provided by Hitachi, the attributes, permission information, and retention information associated with the data preferably should also be copied. This copy feature is explained using the storage system 1 shown in FIG. 1.

Figure 11:
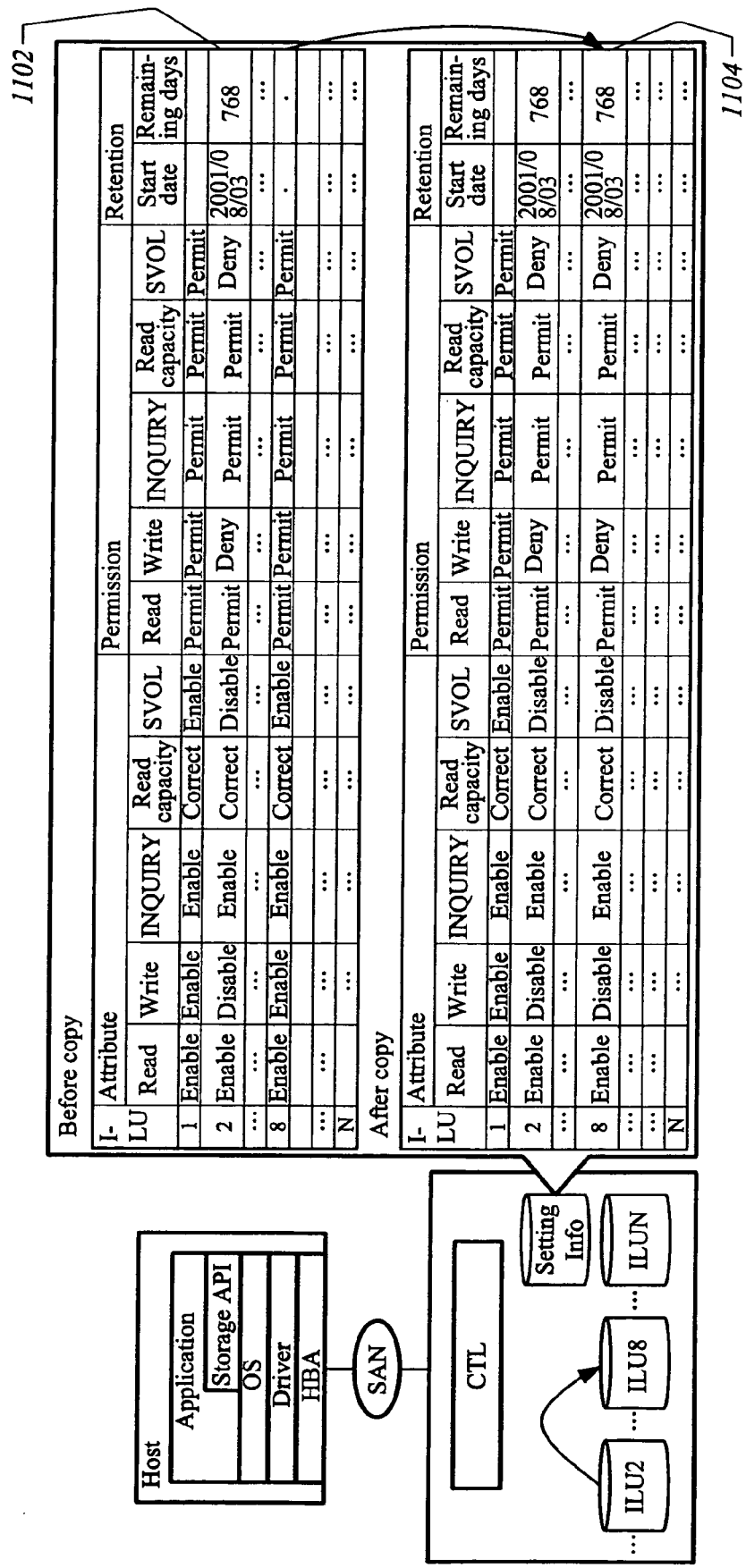
FIG. 11 illustrates a logical architecture associated with the copy feature in question.

FIG. 11 illustrates a logical architecture associated with the copy feature in question. The host uses the application, storage API, OS, driver, and HBA. The storage API for the application controls the copy feature of the storage subsystem. The storage subsystem includes a plurality of I-LUs and the setting information for I-LUs. The I-LU may be connected to a port as an LU. The internal LU may be provided with any suitable configuration, e.g., the RAID0, RAID 1, RAID 0+1, RAID 5, and the like. The setting information is stored in the cache or the I-LU as part of nonvolatile storage, e.g., NVRAM, to avoid the loss of the setting information during a power failure. First setting information 1102 represents the setting information as defined prior to copy operation. Second setting information 1104 represents the setting information as defined after the copy operation.

In FIG. 11, the data stored in I-LU2 is copied to I-LU8. With these data, the attribute, permission information, and retention information are copied using ShadowImage™. This procedure involves the following steps.

Figure 11A:
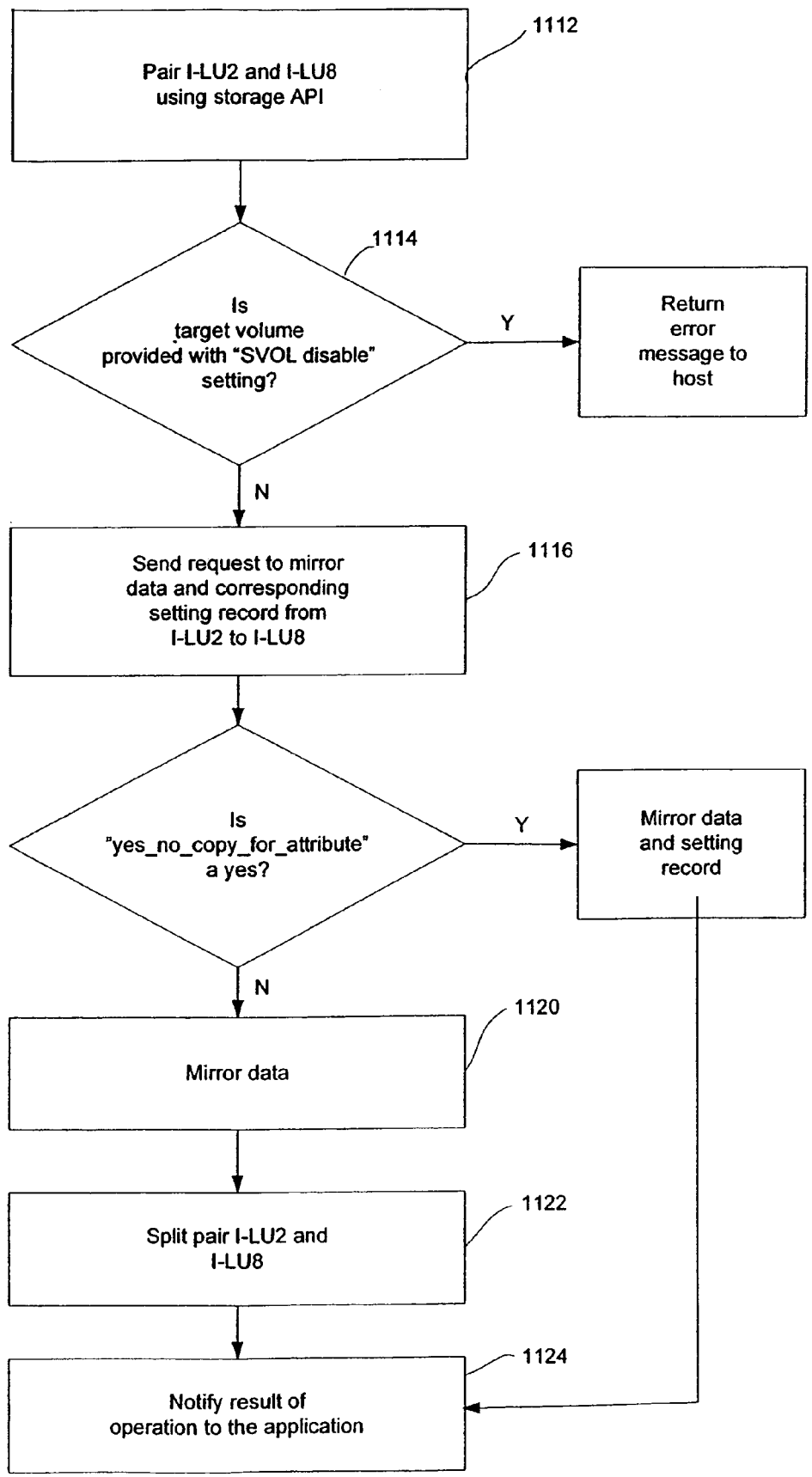
FIG. 11A is a flow diagram illustrating the procedure of copying the setting record.

As shown in FIG. 11A, the application pairs I-LU2 and I-LU8 using the storage API (step 1112). The following is an exemplary request:

operation_number=(int) make_pair (int primary_internal_LU, secondary_Internal_LU)

At step 1114, the controller checks whether or not the target volume is provided with the "SVOL disable" setting. If so, the controller returns an error message to the host. Otherwise, the process proceeds to the next step.

At step 1116, the application sends a request to the controller to mirror the data and a corresponding setting record from I-LU2 to I-LU8. The setting record refers to the setting information for a given I-LU or storage volume. The setting record includes attribute, permission information, and retention information for the data in question. The following is an exemplary request:

mirror(operation_number, yes_no_copy_for_attribute)

At step 1118, if the 'yes_no_copy_for_attribute' is yes, the controller starts to mirror the data and the setting record. If the 'yes_no_copy_for_attribute' is no, the controller starts to mirror the data (step 1120). The application splits the pair, i.e., I-LU2 and I-LU8, after mirroring has been completed (step 1122). The controller notifies the result of the operation to the application (step 1124).

In one embodiment, the data migration is performed automatically without being initiated by an administrator using a control means (e.g. program) in the console 50 and scheduling the migration process in advance. Below is the description of an automatic migration process.

FIG. 12 shows an example of migration management table 1200 according to one embodiment of the present invention. Each row 1201, 1202, or 1203 specifies the information about the LU that may be migrated in the future. The source storage refers to the storage subsystem where the source LUs reside. The destination storage refers to the storage system to the target LUs reside.

Elements or records 1211, 1212, 1213 and 1214 are information relating to the source storage. A storage ID 1211 is the identification information of the source storage. It identifies the storage system, for example, by the serial number of the storage system or a unique integer value in the system. An I-LU field 1212 is an identification number that is assigned to each I-LU. A first preservation time field 1213 indicates how many days the data should be preserved in the source storage device. For example, the LU 2 of the record 1201 indicates the data stored therein is to be migrated after 500 days.

In the present embodiment, the migration management table 1200 is managed by the control program in console 50. The preservation time is decremented by one each day. Once the number becomes zero, then the data are migrated, as explained below.

Elements 1214, 1215 and 1216 relate to information about the destination storage. A storage ID field 1214 provides the identification information of the destination storage. An I-LU field 1215 indicates the identification number of the target I-LU to which the data are to be migrated. A second preservation time field 1216 corresponds to the preservation time 1213; however, the zero value for the second preservation time 1216 does not initiate data migration. Rather, the zero value means that the data are to remain in that I-LU of the destination storage. For example, since the second preservation time 1216 for the record 1202 is zero, the data migrated in I-LU 2 and I-LU 3 of the destination storage are to remain in those volumes and not migrated to other storage systems or subsystems.

If the data are to be migrated to yet another storage device, the elements 1214, 1215, and 1216 are provided with two or more values. For example, the record 1203 includes sub-records 1222 and 1224 for the destination storage. The record 1203 indicates that the data stored in I-LU 5 of the storage subsystem 20 is to be migrated to I-LU 5 of the storage subsystem 30 after 300 days. Four hundred days thereafter, the migrated data are then transferred to I-LU 2 of the storage subsystem 42. The data then remains in that I-LU-2 indefinitely since the preservation time is zero for the sub-record 1224.

In the present embodiment, the console 50 checks the migration management table 1200 and invokes the migration operation when those LUs whose first preservation time 1203 becomes zero. The processing flow is similar to that of the processes 800 and 1000, except that the console 50 itself invokes the migration operation instead of the administrator. After the migration operation is completed, the console 50 updates the migration management table 1200.

FIG. 13 illustrates how the content of the migration management table 1200 has been changed after 300 days have elapsed. The data stored in I-LU 5 of the subsystem 20 are migrated to I-LU 5 of the subsystem 30. The information from the sub-record 1222 have replaced the previous information in the elements 1211, 1212, and 1213. The sub-record 1224 have become the only information provided for the elements 1204, 1205, and 1206.

In the above embodiment, the data to be migrated are managed based on block units of LU. In other implementations, smaller units than LUs may be used to manage the data, e.g., the continuous area designated by two LBAs (Logical Block Addresses). Alternatively, the data may be managed by a group of LUs.

The present invention has been described in terms of specific embodiments. The embodiments described above may be modified, altered, or changed without departing from the scope of the present invention. The scope of the present invention should be interpreted based on the appended claims.

What is claimed is:

1. A storage system having a first storage subsystem and a second storage subsystem coupled to a host computer via a network, wherein, the first storage subsystem includes:
   first and second storage volumes storing data accessed from the host computer according to a block access command;
   first retention information associated with the first storage volumes; and
   second retention information associated with the second storage volume; and the second storage subsystem includes:
   storage volumes storing data; and
   a setting information storage area, wherein data in the first storage volume are copied to a third storage volume of the storage volumes in the second storage subsystem and a third retention information corresponding to the first retention information is stored in the setting information storage area of the second storage subsystem according to a request for copying the data in the first storage volume so that write access to the third storage volume is prohibited based on the third retention information after the data stored in the first storage volume are copied to the third storage volume;

wherein data in the second storage volume are copied to a fourth storage volume of the storage volumes in the second storage subsystem and a fourth retention information corresponding to the second retention information is stored in the setting information storage area of the second storage subsystem according to a request for copying the data in the second storage volume so that write access to the fourth storage volume is prohibited based on the fourth retention information after the data stored in the second storage volume are copied to the fourth storage volume; and wherein the third retention information take over remaining days in the first retention information, the remaining days indicating the number of days for which write access to a storage volume is prohibited.

2. The storage system of claim 1, wherein the block access command includes SCSI and iSCSI.

3. The storage system of claim 1, wherein the first retention information is copied and stored as the third retention information.

4. The storage system of claim 1, wherein the data are copied from the first storage volume to the third storage volume after a first retention period for the first storage volume has expired, the first retention information defining the first retention period.

5. The storage system of claim 1, wherein the setting information storage area includes a cache memory.

6. The storage system of claim 1, wherein the setting information storage area includes a storage volume.

* * * * *